(12) United States Patent
Gordon et al.

(10) Patent No.: US 12,395,530 B2
(45) Date of Patent: Aug. 19, 2025

(54) SYSTEMS AND METHODS FOR ESTABLISHING A SECURE COMMUNICATION LINK IN AN ELECTRIC POWER DISTRIBUTION SYSTEM

(71) Applicant: Schweitzer Engineering Laboratories, Inc., Pullman, WA (US)

(72) Inventors: Colin Gordon, Katy, TX (US); Duane C. Skelton, Bellingham, WA (US); Abhilash Manjunath, Mill Creek, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 748 days.

(21) Appl. No.: 17/201,359

(22) Filed: Mar. 15, 2021

(65) Prior Publication Data
US 2022/0294824 A1     Sep. 15, 2022

(51) Int. Cl.
*H04L 9/40* (2022.01)

(52) U.S. Cl.
CPC .......... *H04L 63/20* (2013.01); *H04L 63/0435* (2013.01)

(58) Field of Classification Search
CPC ....................................................... H04L 63/20
See application file for complete search history.

(56) References Cited

U.S. PATENT DOCUMENTS

| | | | |
|---|---|---|---|
| 7,729,276 B2 | 6/2010 | Akyol | |
| 9,871,766 B2* | 1/2018 | Syed Mohamed | ......................... H04L 63/0263 |
| 9,967,372 B2* | 5/2018 | Arangasamy | ........... H04L 69/22 |
| 11,496,329 B2* | 11/2022 | Nagarajan | ........... H04L 12/4633 |
| 2015/0207793 A1* | 7/2015 | Mohamed | ............. H04W 12/08 726/6 |
| 2019/0116183 A1 | 4/2019 | Hussain | |
| 2019/0173860 A1 | 6/2019 | Sankaran | |
| 2019/0342101 A1 | 11/2019 | Hayes | |
| 2020/0106719 A1 | 4/2020 | Acharya | |

OTHER PUBLICATIONS

"IEEE Standard for Local and metropolitan area networks—Media Access Control (MAC) Security", IEEE Standard 802.1AE-2018. IEEE Computer Society, Sep. 27, 2018. 239 pgs. (Year: 2018).*
"IEEE Standard for Local and Metropolitan Area Networks—Port-Based Network Access Control", IEEE Standard 802.1X-2020. IEEE Computer Society, Jan. 30, 2020. 289 pgs. (Year: 2020).*

* cited by examiner

*Primary Examiner* — Zachary A. Davis
(74) *Attorney, Agent, or Firm* — Fletcher Yoder, P.C.

(57) ABSTRACT

An intelligent electronic device (IED) of an electric power distribution system includes processing circuitry and a memory that includes instructions. The instructions, when executed by the processing circuitry, are configured to cause the processing circuitry to transmit a first data frame and a second data frame to a switch of the electric power distribution system, determine whether the switch transmits the first data frame and not the second data frame, and establish a media access control security key agreement (MKA) based on a determination of whether the switch transmits the first frame and not the second data frame.

9 Claims, 5 Drawing Sheets

SYSTEMS AND METHODS FOR ESTABLISHING A SECURE COMMUNICATION LINK IN AN ELECTRIC POWER DISTRIBUTION SYSTEM

BACKGROUND

This disclosure relates to systems and methods for establishing a secure communication link between different devices of an electric power distribution system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

Electric power distribution systems carry electricity from a transmission system to residential communities, factories, industrial areas, and other electricity consumers. An electric power distribution system may include various intelligent electronic devices (IEDs) that may communicate with other devices of the electric power distribution system during operation of the electric power distribution system. For example, the IED may receive and/or transmit a signal and/or data in order to perform a functionality, such as to control a circuit breaker in response to electrical measurements of the electric power distribution system. Unfortunately, it may be difficult to establish a secure communication link between the IED and other devices of the electric power distribution system to enable the devices to securely communicate with one another. For example, a switch used to transmit information between IEDs may not be designed to enable a secure communication link of a particular configuration.

SUMMARY

Certain examples commensurate in scope with the originally claimed subject matter are discussed below. These examples are not intended to limit the scope of the disclosure. Indeed, the present disclosure may encompass a variety of forms that may be similar to or different from the examples set forth below.

In an embodiment, an intelligent electronic device (IED) of an electric power distribution system includes processing circuitry and a memory that includes instructions. The instructions, when executed by the processing circuitry, are configured to cause the processing circuitry to transmit a first data frame and a second data frame to a switch of the electric power distribution system, determine whether the switch transmits the first data frame and not the second data frame, and establish a media access control security key agreement (MKA) based on a determination of whether the switch transmits the first frame and not the second data frame.

In an embodiment, a tangible, non-transitory, computer-readable medium includes instructions. The instructions, when executed by processing circuitry, are configured to cause the processing circuitry to operate in an auto-discovery mode, receive a first data frame from a switch of an electrical power distribution system during operation in the auto-discovery mode, determine whether a second data frame is received from the switch upon receipt of the first data frame from the switch, and establish a media access control security key agreement (MKA) connectivity association based on a determination of whether the second data frame is received upon receipt of the first data frame.

In an embodiment, a system includes a first intelligent electronic device (IED) configured to transmit a first data frame and a second data frame to a switch. The system also includes a second IED configured to receive the first data frame from the switch, establish a media access control security key agreement (MKA) connectivity association between the first IED and the second IED based on the second data frame in response to receipt of the second data frame from the switch, and establish the MKA connectivity association based on the first data frame instead of based on the second data frame in response to receipt of the first data frame and not the second data frame from the switch.

DETAILED DESCRIPTION

Figure 1:
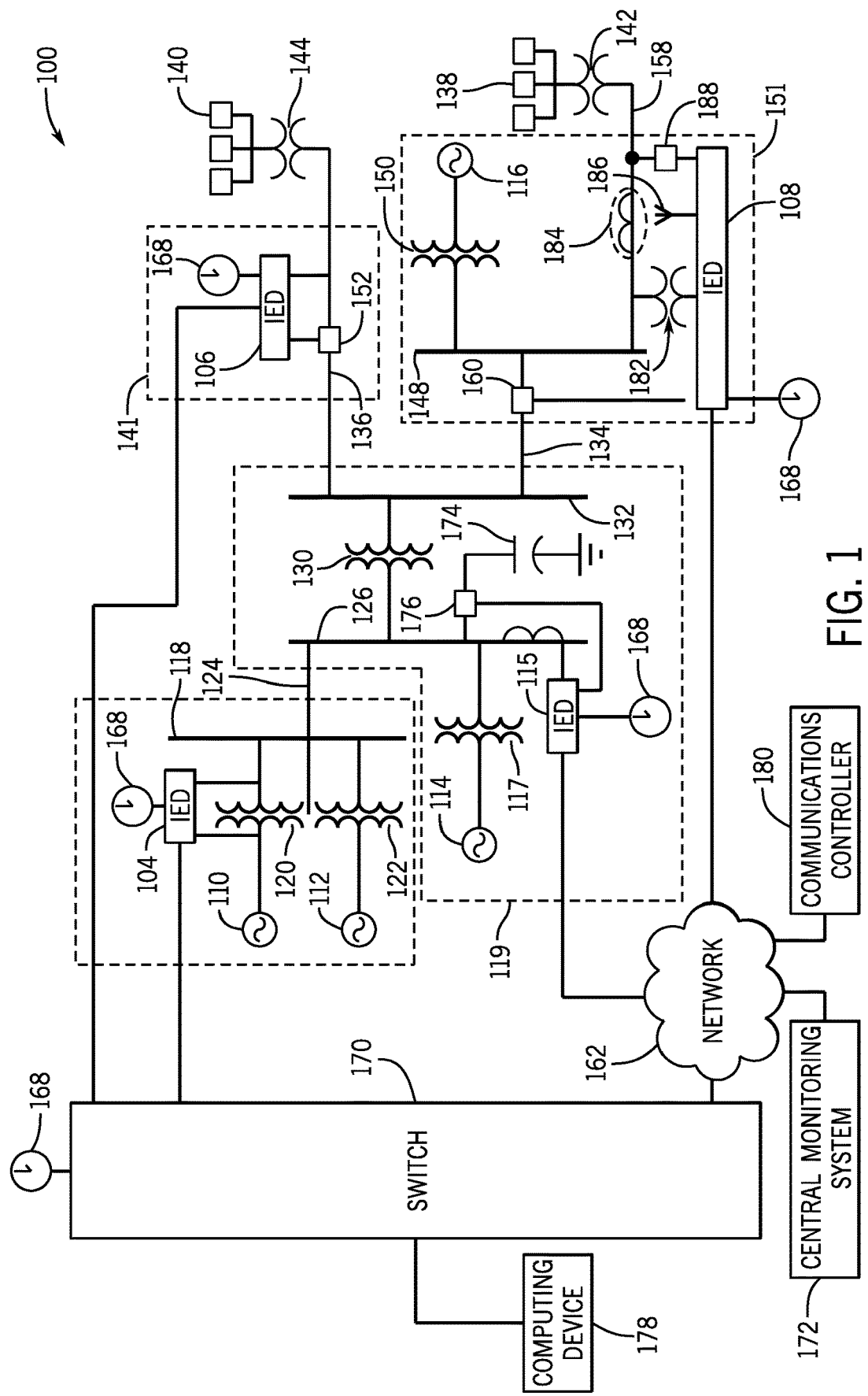
FIG. 1 is a schematic diagram of an embodiment of an electric power distribution system, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the procedures of a method do not necessarily need to be executed in any specific order, or even sequentially, nor need the procedures be executed only once, unless otherwise specified. In some cases, well-known features, structures or operations are not shown or described in detail. Furthermore, the described features, structures, or operations may be combined in any suitable manner in one or more embodiments. The components of the embodiments as generally described and illustrated in the figures could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular abstract data type.

In certain embodiments, a particular software module or component may include disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

Embodiments of the present disclosure are directed to establishing a secure communication link between devices of an electric power distribution system. Intelligent electronic devices (IEDs) may be used to control certain devices and to perform certain operations of the electric power distribution system. For example, an IED may be a relay that enables or blocks electrical power flow between other devices of the electric power distribution system. The IED may, for instance, communicate with a computing device, and the IED may operate based on the communication with the computing device (e.g., based on a user input). Furthermore, multiple IEDs may transmit data, such as operating information or sensor data, to one another to control various functions of devices of the electric power distribution system. As such, the IEDs may facilitate operation of the electric power distribution system.

In some embodiments, the IEDs may establish a media access control security (MACsec) communication link or channel and/or a respective MACsec key agreement (MKA) connectivity association with one another to communicate data. To establish the MACsec communication link, an MKA protocol is used to enable communications between the IEDs. During the MKA protocol, a first IED may select a connectivity association key (CAK) from a set of keys (e.g., a generated set of keys, a distributed set of keys) and distribute the CAK or a copy of the CAK to a second IED via an adoption link. An MKA connectivity association may be established upon verification that each of the IEDs possesses the same CAK. The first IED may then select a security association key (SAK) from the set of the keys for distribution to the second IED via the MKA connectivity association. The first IED may retain a copy of the same SAK, and the IEDs may use their respective copies of the SAK to establish a MACsec communication link for communicating with one another. For example, each of the IEDs may encrypt data using their copy of the SAK and/or may decrypt encrypted data using their copy of the SAK in order to transmit data securely between one another.

The electric power distribution system may also include a switch that enables data to be transmitted between IEDs, thereby enabling the IEDs to communicate with one another. For example, the switch may receive data from the first IED and then transmit the data to the second IED to enable the first IED and the second IED to communicate the data with one another. In some circumstances, it may be desirable for devices to establish a certain MKA connectivity association to enable communication with one another. For example, the MKA connectivity association may be of a specific configuration that may enable greater user customization or selection of various settings of the devices to configure the devices to communicate. Unfortunately, certain switches may not enable such MKA connectivity associations to be established. For example, the switch may not recognize information (e.g., the specific MKA data frame) received from devices for establishing the configuration of MKA connectivity associations. Accordingly, the switch may not enable data to be transmitted between devices, such as the IEDs, via the MKA connectivity associations. As a result, in some cases, a user (e.g., a technician, an operator) may have to manually adjust device settings of the devices to enable such a configuration of MKA connectivity associations, thereby increasing a complexity associated with communicatively coupling devices of the electric power distribution system.

Thus, it is presently recognized that enabling devices to automatically establish a suitable MKA connectivity association with any embodiment or type of a switch may improve or simplify the process for communicatively coupling devices of the electric power distribution system. Accordingly, embodiments of the present disclosure are directed to operation in an auto-discovery mode to determine a particular configuration of the MKA connectivity association to be established. During the auto-discovery mode, a first device may simultaneously transmit two different data frames (e.g., two MKA data frames) to the switch for subsequent transmission to a second device. A first data frame may include information that may enable any embodiment of the switch to transmit the first data frame to the second device for enabling a first configuration of the MKA connectivity association to be established with the second device. A second data frame may include information for enabling a second configuration of the MKA connectivity association to be established with the second device, but certain embodiments of the switch may not readily transmit the second data frame to the second device. If the second device receives the second data frame, the second configuration of the MKA connectivity association may be automatically established. However, if the second device does not receive the second data frame and only receives the first data frame, the first configuration of the MKA connectivity association may automatically be established. In either case, the devices may be able to automatically establish a suitable MKA connectivity association for communicating subsequent data via the switch without having to receive a user input that manually configures establishment of the MKA connectivity association.

With the preceding in mind, FIG. 1 is a schematic diagram of an electric power distribution system 100 that may generate, transmit, and/or distribute electric energy to various loads (e.g., different structures). The electric power distribution system 100 may use various IEDs 104, 106, 108, 115 to control certain aspects of the electric power distribution system 100. As used herein, an IED (e.g., the IEDs 104, 106, 108, 115) may refer to any processing-based device that monitors, controls, automates, and/or protects monitored equipment within the electric power distribution system 100. Although the present disclosure primarily discusses the IEDs 104, 106, 108, 115 as relays, such as a remote terminal unit, a differential relay, a distance relay, a directional relay, a feeder relay, an overcurrent relay, a voltage regulator control, a voltage relay, a breaker failure relay, a generator relay, and/or a motor relay, additional IEDs 104, 106, 108, 115 may include an automation controller, a bay controller, a meter, a recloser control, a communications processor, a computing platform, a programmable logic controller (PLC), a programmable automation controller, an input and output module, and the like. Moreover, the term IED may be used to describe an individual IED or a system including multiple IEDs.

For example, the electric power distribution system 100 may be monitored, controlled, automated, and/or protected using the IEDs 104, 106, 108, 115, and a central monitoring system 172 (e.g., an industrial control system). In general, the IEDs 104, 106, 108, 115 may be used for protection, control, automation, and/or monitoring of equipment in the electric power distribution system 100. For example, the IEDs 104, 106, 108, 115 may be used to monitor equipment of many types, including electric power lines, electric power lines, current sensors, busses, switches, circuit breakers, reclosers, transformers, autotransformers, tap changers, voltage regulators, capacitor banks, generators, motors, pumps, compressors, valves, and a variety of other suitable types of monitored equipment.

A common time signal may be distributed throughout the electric power distribution system 100. Utilizing a common time source may ensure that IEDs 104, 106, 108, 115 have a synchronized time signal that can be used to generate time synchronized data, such as synchrophasors. In various embodiments, the IEDs 104, 106, 108, 115 may receive a common time signal 168. The time signal may be distributed in the electric power distribution system 100 using a communications network 162 and/or using a common time source, such as a Global Navigation Satellite System ("GNSS"), or the like.

The IEDs 104, 106, 108, 115 may be used for controlling various other equipment of the electrical power distribution system 100. By way of example, the illustrated electric power distribution system 100 includes electric generators 110, 112, 114, 116 and power transformers 117, 120, 122, 130, 142, 144, 150. The electric power distribution system 100 may also include electric power lines 124, 134, 136, 158 and/or busses 118, 126, 132, 148 to transmit and/or deliver power, circuit breakers 152, 160, 176 to control flow of power in the electric power distribution system 100, and/or loads 138, 140 to receive the power in and/or from the electric power distribution system 100. A variety of other types of equipment may also be included in electric power distribution system 100, such as a voltage regulator, a capacitor (e.g., a capacitor 174), a potential transformer (e.g., a potential transformer 182), a current sensor (e.g., a wireless current sensor (WCS) 184), an antenna (e.g., an antenna 186), a capacitor banks (e.g., a capacitor bank (CB) 188), and other suitable types of equipment useful in power generation, transmission, and/or distribution.

A substation 119 may include the electric generator 114, which may be a distributed generator and which may be connected to the bus 126 through the power transformer 117 (e.g., a step-up transformer). The bus 126 may be connected to the distribution bus 132 via the power transformer 130 (e.g., a step-down transformer). Various electric power lines 136, 134 may be connected to the distribution bus 132. The electric power line 136 may lead to a substation 141 in which the electric power line 136 is monitored and/or controlled using the IED 106, which may selectively open and close the circuit breaker 152. The load 140 may be fed from the electric power line 136, and the power transformer 144 (e.g., a step-down transformer) in communication with the distribution bus 132 via electric power line 136 may be used to step down a voltage for consumption by the load 140.

The electric power line 134 may deliver electric power to the bus 148 of the substation 151. The bus 148 may also receive electric power from the distributed electric generator 116 via the power transformer 150. The electric power line 158 may deliver electric power from the bus 148 to the load 138 and may include the power transformer 142 (e.g., a step-down transformer). The circuit breaker 160 may be used to selectively connect the bus 148 to the electric power line 134. The IED 108 may be used to monitor and/or control the circuit breaker 160 as well as the electric power line 158.

According to various embodiments, the central monitoring system 172 may include one or more of a variety of types of systems. For example, the central monitoring system 172 may include a supervisory control and data acquisition (SCADA) system and/or a wide area control and situational awareness (WACSA) system. A switch 170 may be in communication with the IEDs 104, 106, 108, 115. The IEDs 104, 106, 108, 115 may be remote from the switch 170 and may communicate over various media. For instance, the switch 170 may be directly in communication with the IEDs 104, 106 and may be in communication with the IEDs 108, 115 via the communications network 162.

The switch 170 may enable or block data flow between any of the IEDs 104, 106, 108, 115. For example, during operation of the electric power distribution system 100, the IEDs 104, 106, 108, 115 may transmit data with one another to perform various functionalities for the electric power distribution system 100 by initially transmitting the data to the switch 170. The switch 170 may receive the data and may subsequently transmit the data to an intended recipient of the data. The switch 170 may also control data flow between one of the IEDs 104, 106, 108, 115 and another device communicatively coupled to the switch 170, such as a computing device 178. For instance, the computing device 178 may be a laptop, a mobile phone, a desktop, a tablet, or another suitable device with which a user (e.g., a technician, an operator) may interact. As such, the user may utilize the computing device 178 to receive data, such as operating data, from the electric power distribution system 100 via the switch 170 and/or to send data, such as a user input, to the electric power distribution system 100 via the switch 170. Thus, the switch 170 may enable or block operation of the electric power distribution system 100 via the computing device 178.

A communications controller 180 may interface with equipment in the communications network 162 to create a Software-Defined Network (SDN) that facilitates communication between the switch 170, the IEDs 104, 106, 108, 115, and/or the central monitoring system 172. In various embodiments, the communications controller 180 may interface with a control plane (not shown) in the communications network 162. Using the control plane, the communications controller 180 may direct the flow of data within the communications network 162. Indeed, the communications controller 180 may communicate with the switch 170 to instruct the switch 170 to transmit certain data (e.g., data associated with a certain set of characteristics or information) to a particular destination (e.g., an intended recipient) using flows, matches, and actions defined by the communications controller 180.

In some embodiments, the IEDs 104, 106, 108, 115 may communicate with one another via an MKA connectivity association and/or a MACsec communication link or channel. The MACsec communication link may be initiated via SAKs distributed to enable encryption and/or decryption of data. To this end, one of the IEDs 104, 106, 108, 115 and/or a key device (e.g., a key server) may generate and distribute keys, such as CAKs and/or SAKs, to another of the IEDs 104, 106, 108, 115 to establish the MKA connectivity association and/or the MACsec communication link between the IEDs 104, 106, 108, 115. For instance, the MKA connectivity association may be established via an MKA protocol that includes establishing an adoption link between two of the IEDs 104, 106, 108, 115, distributing a CAK via the adoption link, establishing an MKA connectivity association between the IEDs based on a verified possession of the CAK, distributing an SAK via the MKA connectivity association, and communicating data using the SAK. Indeed, identical copies of the same SAK may be used to encrypt data to be transmitted as well as to decrypt encrypted data that has been received. Such encrypted data is transmitted via a MACsec communication link to transmit the data securely. Although the present disclosure primarily discusses the use of MKA connectivity associations and MACsec communication links to communicate data, any other suitable communication techniques may be used to communicate data between devices of the electric power distribution system 100.

A particular configuration of the MKA connectivity association may be established to enable any embodiment of the switch 170 to communicate data (e.g., to enable data transmission between the IEDs 104, 106, 108, 115). Embodiments of the present disclosure are directed to establishing the particular configuration of the MKA connectivity association automatically. For example, during initial establishment of the MKA connectivity association between devices of the electric power distribution system 100, a first MKA frame (e.g., a first MKA Ethernet frame) for establishment of a first configuration of communication (e.g., a first configuration of the MKA connectivity association) and a second MKA frame (e.g., a second MKA Ethernet frame) for establishment of a second configuration communication (e.g., a second configuration of the MKA connectivity association) may be transmitted to the switch 170 for subsequent receipt by another device of electric power distribution system 100. The first MKA frame may be configured such that any embodiment of the switch 170 will transmit the first MKA frame to the other device to enable establishment of the first configuration of the MKA connectivity association. However, certain embodiments of the switch 170 may not transmit the second MKA frame to the other device to enable establishment of the second configuration of the MKA connectivity association.

If the other device receives the second MKA frame, the second MKA frame may be used to establish the second configuration of the MKA connectivity association. However, if the other device does not receive the second MKA frame and only receives the first MKA frame, the first MKA frame may be used instead to establish the first configuration of the MKA connectivity association. In this manner, a particular configuration of the MKA connectivity association may be automatically established to enable communication between the devices with any embodiment of the switch 170.

Figure 2:
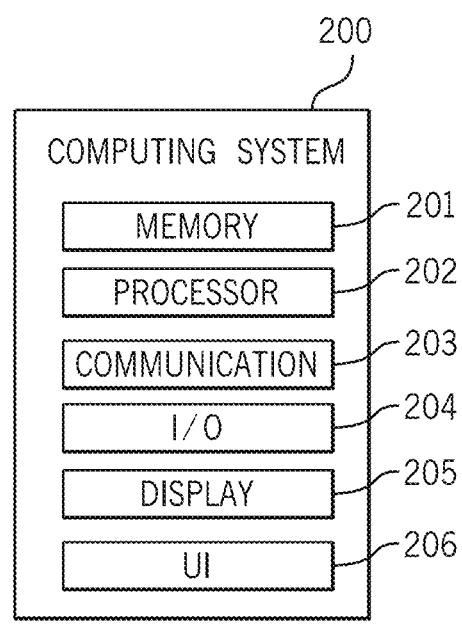
FIG. 2 is a schematic diagram of an embodiment of a computing system that may be incorporated in a device of an electric power distribution system, in accordance with an embodiment of the present disclosure.

FIG. 2 is a schematic diagram of an embodiment of a computing system 200 that may be incorporated within a device of the electric power distribution system 100. For example, any of the IEDs 104, 106, 108, 115, the switch 170, the computing device 178, and/or the communications controller 180 may include the computing system 200. The computing system 200 may include a memory 201 and a processor or processing circuitry 202. The memory 201 may include a non-transitory computer-readable medium that may store instructions that, when executed by the processor 202, may cause the processor 202 to perform various methods described herein. To this end, the processor 202 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 202 may, in some embodiments, include multiple processors.

The computing system 200 may also include a communication system 203, which may include a wireless and/or wired communication component to establish a communication link with another device of the electric power distribution system 100. That is, the communication system 203 enables the computing system 200 (e.g., of one of the IEDs 104, 106, 108, 115) to communication with another communication system 203 of another computing system 200 (e.g., of the switch 170), such as via a MACsec communication link. Indeed, the communication system 203 may include any suitable communication circuitry for communication via a personal area network (PAN), such as Bluetooth® or Zigbee®, a local area network (LAN) or wireless local area network (WLAN), such as an 802.11x Wi-Fi network, and/or a wide area network (WAN), (e.g., third-generation (3G) cellular, fourth-generation (4G) cellular, near-field communications technology, universal mobile telecommunication system (UMTS), long term evolution (LTE), long term evolution license assisted access (LTE-LAA), fifth-generation (5G) cellular, and/or 5G New Radio (5G NR) cellular). The communication system 203 may also include a network interface to enable communication via various protocols such as EtherNet/IP®, ControlNet®, DeviceNet®, or any other industrial communication network protocol.

Additionally, the computing system 200 may include input/output (I/O) ports 204 that may be used for communicatively coupling the computing system 200 to an external device. For example, the I/O ports 204 of the computing system 200 of the switch 170 may communicatively couple to corresponding I/O ports 204 of the computing system 200. The computing system 200 may further include a display 205 that may present any suitable image data or visualization. Indeed, the display 205 may present image data that includes various information regarding the electric power distribution system 100, thereby enabling the user to observe an operation, a status, a parameter, other suitable information, or any combination thereof, of the electric power distribution system 100. Further still, the computing system 200 may include a user interface (UI) 206 with which the user may interact to control an operation of the computing system 200. For instance, the UI 206 may include a touch screen (e.g., as a part of the display 205), an eye-tracking sensor, a gesture (e.g., hand) tracking sensor, a joystick or physical controller, a button, a knob, a switch, a dial, a trackpad, a mouse, another component, or any combination thereof. As an example, the user may utilize the UI 206 of the computing system 200 of the computing device 178 to transmit data to the switch 170.

Figure 3:
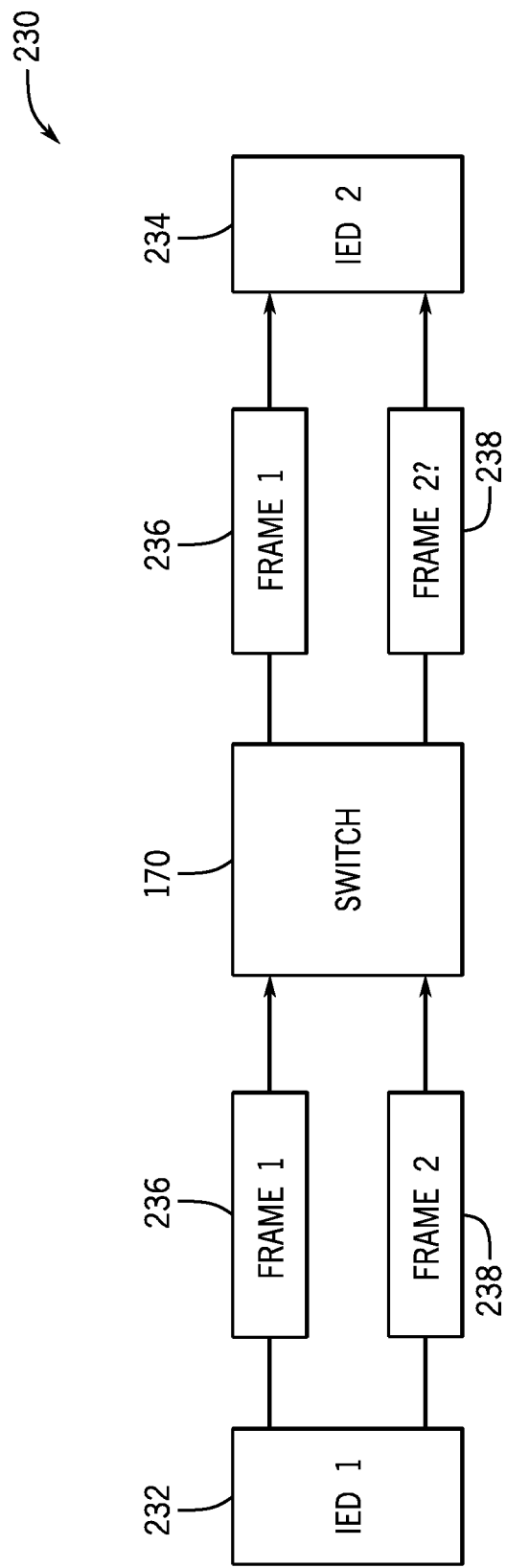
FIG. 3 is a schematic diagram of an embodiment of a communication network in which intelligent electronic devices are communicatively coupled to a switch, in accordance with an embodiment of the present disclosure.

FIG. 3 is a schematic diagram of an embodiment of a communication network 230, such as a communication network of the electric distribution system 100, in which a first IED 232 (e.g., one of the IEDs 104, 106, 108, 115) and a second IED 234 (e.g., another one of the IEDs 104, 106, 108, 115) are communicatively coupled to the switch 170. It may be desirable for the first IED 232 and the second IED 234 to communicate with one another via an MKA connectivity association and/or a MACsec communication link established between the IEDs 232, 234. However, the switch 170 may not enable a certain configuration of the MKA connectivity association to be established between the IEDs 232, 234. To this end, each of the IEDs 232, 234 may operate in an auto-discovery mode to determine a particular configuration of the MKA connectivity association that enables communication with one another via the switch 170.

During the auto-discovery mode, the first IED 232 may transmit (e.g., transmit in a common data packet, transmit within a threshold duration of time, transmit sequentially based on a determined receipt) a first MKA frame 236 and a second MKA frame 238 to the switch 170 for intended receipt by the second IED 234. The first MKA frame 236 may include information for establishment of a first configuration of an MKA connectivity association, and the second MKA frame 238 may include information for establishment of a second configuration of an MKA connectivity association. For example, each MKA frame 236, 238 may include Internet Protocol (IP) address information, destination media access control (DMAC) information, port number information (e.g., transmission control protocol (TCP) port number information), EtherType information, other suitable information, or any combination thereof. Such information may be used to communicate in accordance to a specific configuration. For instance, the IEDs 232, 234 may use such information defined in one of the MKA frames 236, 238 to adjust device settings to establish the specific configuration of the MKA connectivity association between the IEDs 232, 234. The configuration of the MKA connectivity association may define a particular manner in which data is communicated, such as a parameter or characteristic of a MACsec communication link established based on the MKA connectivity association.

Upon receipt of the second MKA frame 238, certain embodiments of the switch 170 may transmit the second MKA frame 238 to the second IED 234. However, other embodiments of the switch 170 may not transmit the second MKA frame 238 to the second IED 234. By way of example, such embodiments of the switch 170 may not be able to determine that the second MKA frame 238 is to be transmitted to the second IED 234 based on the information included in the second MKA frame 238. However, the information included in the first MKA frame 236 may be specifically defined to enable any embodiment of the switch 170 to transmit the first MKA frame 236 to the second IED 234. In other words, the second IED 234 may receive the first MKA frame 236 regardless of the embodiment of the switch 170 incorporated in the communication network 230, but the second IED 234 may only receive the second MKA frame 238 when a particular embodiment of the switch 170 is incorporated in the communication network 230. For example, the first MKA frame 236 may include different DMAC information and EtherType information than that of the second MKA frame 238 in order to enable the switch 170 to determine that the first MKA frame 236 is to be transmitted to the second IED 234. However, such information may also, for instance, limit a level of customization, reduce interoperability between certain devices, or otherwise restrict certain settings of the IEDs 232, 234 as compared to the information of the second MKA frame 238. Therefore, an MKA connectivity association established in accordance to the second MKA frame 238 may increase a functionality of the IEDs 232, 234.

The second IED 234 may also operate in the auto-discovery mode to determine the configuration of the MKA connectivity association to be established. During the auto-discovery mode, the second IED 234 may determine which of the MKA frames 236, 238 has been received from the first IED 232. In response to receipt of both of the MKA frames 236, 238, the second IED 234 may determine that the second MKA frame 238 is to be used to establish the MKA connectivity association. Thus, the second IED 234 may indicate to the first IED 232 to use the second MKA frame 238 to establish the MKA connectivity association, such as by transmitting data and/or an MKA frame of the same type as the second MKA frame 238 (e.g., via a previously established communication link). In response, the first IED 232 and the second IED 234 may perform the MKA protocol in accordance with the second MKA frame 238, such as by adjusting their respective device settings based on the second MKA frame 238 and performing the MKA protocol based on the adjusted device settings to establish the MKA connectivity association with one another. After establishment of the MKA connectivity association between the IEDs 232, 234 using the second MKA frame 238, a MACsec communication link may be established between the IEDs 232, 234 to enable the IEDs 232, 234 to communicate data with one another. For instance, the IEDs 232, 234 may establish the MACsec communication link using the MKA connectivity association.

However, in response to receipt of the first MKA frame 236 and not the second MKA frame 238 during the auto-discovery mode, the second IED 234 may determine that the first MKA frame 236 is to be used to establish the MKA connectivity association with the first IED 232. As such, the second IED 234 may indicate to the first IED 232 to use the first MKA frame 236 to establish the MKA connectivity association, such as by transmitting data and/or an MKA frame of the same type as the first MKA frame 236 (e.g., via the previously established communication link). In response, the first IED 232 and the second IED 234 may perform the MKA protocol in accordance to the first MKA frame 236, such as by adjusting their respective device settings based on the first MKA frame 236 and performing the MKA protocol based on the adjusted device settings to establish the MKA connectivity association with one another. After establishment of the MKA connectivity association between the IEDs 232, 234 using the first MKA frame 236, a MACsec communication link may be established between the IEDs 232, 234 to enable the IEDs 232, 234 to communicate data with one another.

In this manner, a particular configuration of the MKA connectivity association may be automatically selected for establishment between the IEDs 232, 234 and for enabling communication of data between the IEDs 232, 234. That is, the IEDs 232, 234 may automatically select whether to use the first MKA frame 236 or the second MKA frame 238 to communicate with one another (e.g., without receiving a user input to manually select a specific MKA frame for use). As a result, the IEDs 232, 234 may be setup to communicate with one another more easily.

In some embodiments, the IEDs 232, 234 may operate in the auto-discovery mode during initial setup of communication with one another via the switch 170 (e.g., prior to there being any previously established MKA connectivity associations between the IEDs 232, 234). In additional or alternative embodiments, the IEDs 232, 234 may also operate in the auto-discovery mode after an MKA connectivity association has already been previously established between the IEDs 232, 234. For example, the IEDs 232, 234 may operate in the auto-discovery mode to confirm that the same configuration of the MKA connectivity association may be used (e.g., based on any changes or adjustments to the switch 170). In further embodiments, a user input may enable adjustment of the configuration of the MKA connectivity association. For instance, for a communication network 230 in which the second IED 234 receives both MKA frames 236, 238 (e.g., the switch 170 may enable data with either of the MKA frames 236, 238 to be transmitted), the user input may indicate or select whether the first MKA frame 236 or the second MKA frame 238 is to be used to establish the MKA connectivity association. As an example, if the MKA connectivity association is currently established between the IEDs 232, 234 using the second MKA frame 238, the user input may be indicative of a request to establish an updated MKA connectivity association between the IEDs 232, 234 using the first MKA frame 236 to replace the currently established MKA connectivity association.

Additionally, although the first IED 232 transmits the MKA frames 236, 238 in the illustrated embodiment, the second IED 234 may transmit the MKA frames 236, 238 in an additional or an alternative embodiment, and the first IED 232 may determine which of the MKA frames 236, 238 is received. Further still, it should be noted that the switch 170 may be communicatively coupled to multiple other IEDs that may also operate in the auto-discovery mode to establish a particular configuration of the MKA connectivity association with one another.

Each of FIGS. 4 and 5 discussed below illustrates a method associated with using the auto-discovery mode to determine the MKA connectivity association to be established. In some embodiments, each of the methods may be performed by a single respective component or system, such as by the computing system 200 (e.g., the processor 202). In additional or alternative embodiments, multiple components or systems may perform the procedures for a single one of the methods. It should also be noted that additional procedures may be performed with respect to the described methods. Moreover, certain procedures of the depicted methods may be removed, modified, and/or performed in a different order. Further still, the procedures of any of the respective methods may be performed in parallel with one another, such as at the same time and/or in response to one another.

Figure 4:
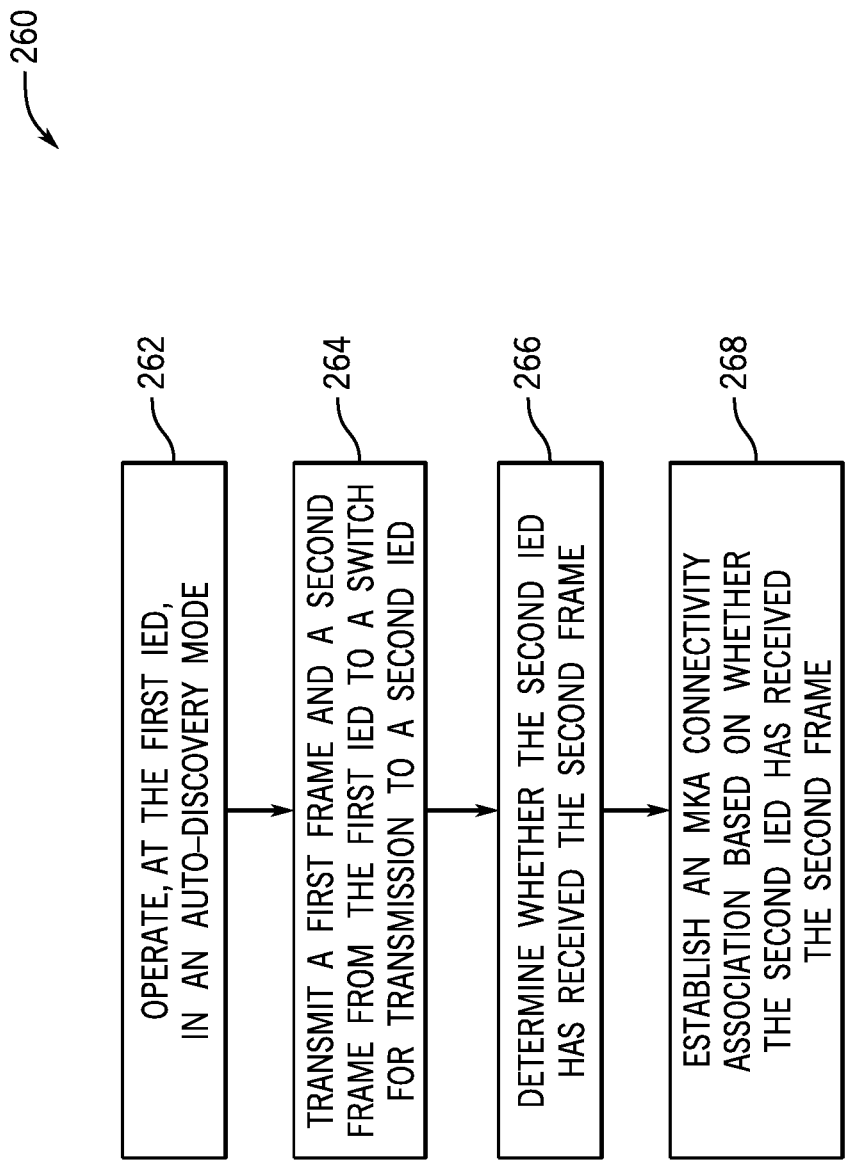
FIG. 4 is a flowchart of an embodiment of a method for operating in an auto-discovery mode to determine a manner in which a secure communication link is to be established, in accordance with an embodiment of the present disclosure.

FIG. 4 is a flowchart of an embodiment of a method 260 for establishing a particular configuration of the MKA connectivity association. The method 260 is described from the perspective of the first IED 232 that may transmit MKA frames 236, 238 during the auto-discovery mode to enable communication with the second IED 234 via the switch 170. However, a method similar to the method 260 may be performed by any other device of the electric power distribution system 100 to establish communications. Further, the method 260 may be performed prior to there being an MKA connectivity association previously established between the IEDs 232, 234, such as during commissioning of the switch 170, and/or to update an MKA connectivity association that is currently established between the IEDs 232, 234.

At block 262, the first IED 232 may operate in an auto-discovery mode. In certain embodiments, the first IED 232 may operate in the auto-discovery mode automatically. In an example, the first IED 232 may operate in the auto-discovery mode based on a determination of a status or an identifier associated with the switch 170 used for communicating data with the second IED 234, such as based on a determination that the first IED 232 has not previously communicated with the switch 170. In another example, the first IED 232 may operate in the auto-discovery mode at a particular frequency or time stamp. In additional or alternative embodiments, the first IED 232 may operate in the auto-discovery mode based on a user input. For instance, a user may utilize the computing device 178 to transmit a request to the first IED 232 to operate in the auto-discovery mode.

At block 264, during operation in the auto-discovery mode, the first IED 232 may transmit (e.g., simultaneously transmit, sequentially transmit) the first MKA frame 236 and the second MKA frame 238 to the switch 170 for subsequent transmission to the second IED 234. For example, the first IED 232 may transmit the first MKA frame 236 and/or the second MKA frame 238 via a communication link previously established between the first IED 232 and the switch 170, such as an Ethernet link (e.g., a physical link, a wireless link). As discussed herein, the first MKA frame 236 may contain information, such as a specific DMAC and/or EtherType, that enables any embodiment of the switch 170 to transmit the first MKA frame 236 to the second IED 234. However, the second MKA frame 238 may contain information that may cause a certain embodiment of the switch 170 to block transmission of the second MKA frame 238 to the second IED 234.

At block 266, the first IED 232 may determine whether the second IED 234 has received the first MKA frame 236 and/or the second MKA frame 238. That is, the first IED 232 may determine whether the switch 170 enables communication via second MKA frame 238. To this end, the first IED 232 may determine whether the switch 170 has transmitted the second MKA frame 238 for receipt by the second IED 234.

In some embodiments, the first IED 232 may determine whether the switch 170 transmitted the second MKA frame 238 based on an indication directly received from the second IED 234. By way of example, the second IED 234 may transmit the second MKA frame 238 (e.g., along with data) and not the first MKA frame 236 back to the first IED 232 to indicate that the second IED 234 received the second MKA frame 238. However, the second IED 234 may transmit the first MKA frame 236 (e.g., along with data) and not the second MKA frame 238 back to the first IED 232 to indicate that the second IED 234 did not receive the second MKA frame 238. In this manner, the first IED 232 may determine whether the second IED 234 has received the second MKA frame 238 based on whether the second MKA frame 238 has been received from the second IED 234.

At block 268, the first IED 232 may establish an MKA connectivity association, such as via the MKA protocol, based on whether the second IED 234 has received the second MKA frame 238. For example, the first IED 232 may use a first CAK generated based on the second MKA frame 238 based on a determination that the second IED 234 received the second MKA frame 238 to establish the MKA connectivity association. Alternatively, the first IED 232 may use a second CAK generated based on the first MKA frame 236 based on a determination that the second IED 234 received the first MKA frame 236 and not the second MKA frame 238 to establish the MKA connectivity association. After establishment of the MKA connectivity association, a MACsec communication link may be established between the IEDs 232, 234. For instance, a SAK may be generated based on the CAK used for establishing the MKA connectivity association. Respective copies of the SAK may be distributed to the IEDs 232, 234 to establish the MACsec communication link. Each of the IEDs 232, 234 may use its copy of the same SAK to communicate data via the MACsec communication link. That is, each of the IEDs 232, 234 may use its copy of the SAK to encrypt data to be transmitted via the MACsec communication link (e.g., to the other of the IEDs 232, 234) and/or to decrypt data transmitted via the MACsec communication link (e.g., from the other of the IEDs 232, 234).

In certain embodiments, the first IED 232 may transmit an indication of the MKA frame being used to establish the MKA connectivity association. As an example, the indication may include a visual output and/or an audio output presented by the first IED 232, a notification transmitted to a separate device (e.g., the computing device 178), another suitable indication, or any combination thereof. The indication may inform a user the manner in which the first IED 232 and the second IED 234 are communicatively coupled with one another to guide the user to operate the devices of the electric power distribution system 100 accordingly.

Figure 5:
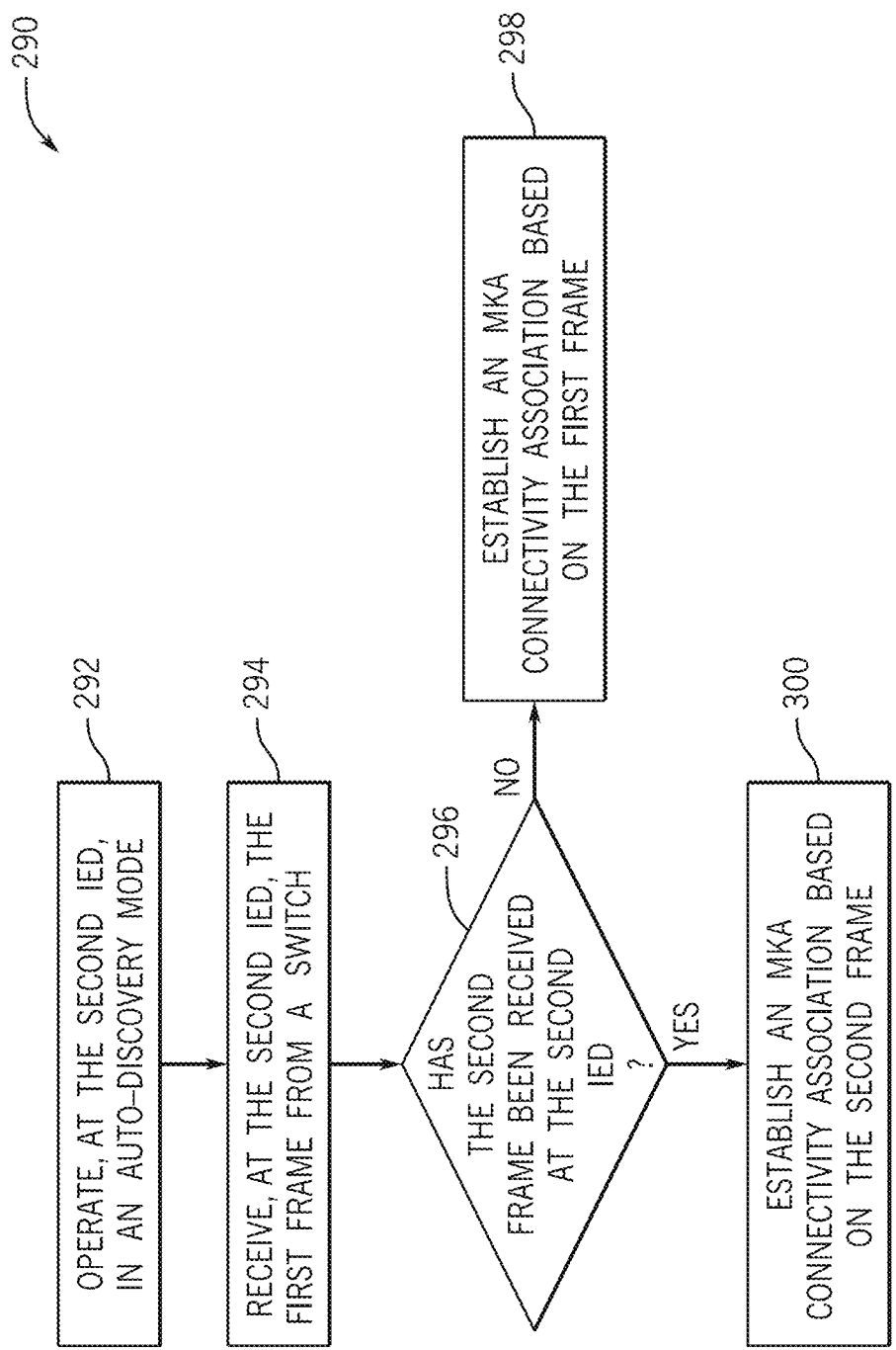
FIG. 5 is a flowchart of an embodiment of a method for operating in an auto-discovery mode to determine a manner in which a secure communication link is to be established, in accordance with an embodiment of the present disclosure.

FIG. 5 is a flowchart of an embodiment of a method 290 for establishing a particular configuration of the MKA connectivity association. The method 290 is described from the perspective of the second IED 234 that may receive MKA frames 236, 238 during the auto-discovery mode to establish the MKA connectivity association. However, a method similar to the method 290 may be performed by any other device of the electric power distribution system 100 to establish the MKA connectivity association. Further, the method 290 may be performed prior to there being an MKA connectivity association previously established between the IEDs 232, 234, such as during commissioning of the switch 170, and/or to update an MKA connectivity association that is currently established between the IEDs 232, 234.

At block 292, the second IED 234 may operate in the auto-discovery mode, such as automatically (e.g., based on a determined parameter of the switch 170) and/or based on a user input (e.g., received from the computing device 178), in order to determine the configuration of the MKA connectivity association to be established between the IEDs 232, 234. Indeed, the second IED 234 may operate in the auto-discovery mode while the first IED 232 operates in the auto-discovery mode. Therefore, the second IED 234 may receive the MKA frame(s) 236, 238 transmitted by the first IED 232 during the auto-discovery mode.

At block 294, during the auto-discovery mode, the second IED 234 may receive the first MKA frame 236 from the switch 170 as initially transmitted by the first IED 232 to the switch 170. As an example, the second IED 234 may receive the first MKA frame 236 via a communication link previously established between the second IED 234 and the switch 170, such as another Ethernet link. Indeed, the first MKA frame 236 may be structured such that the second IED 234 may receive the first MKA frame 236 regardless of the embodiment of the switch 170. At block 296, during the auto-discovery mode, the second IED 234 may determine whether the second MKA frame 238 is also received. In some embodiments, the second IED 234 may determine whether the second MKA frame 238 is received within a threshold period of time since receiving the first MKA frame 236. To this end, the second IED 234 may monitor a duration of time that has elapsed since receipt of the first MKA frame 236, such as by initiating a timer upon receiving the first MKA frame 236. By way of example, the threshold period of time may be an amount of time between three seconds and twenty seconds (e.g., six seconds, eight seconds).

At block 298, in response to a determination that the second MKA frame 238 has not been received (e.g., within the threshold period of time), the second IED 234 may establish an MKA connectivity association based on the first MKA frame 236. For example, the second IED 234 may transmit the first MKA frame 236 (e.g., along with data) back to the first IED 232 to indicate that the second MKA frame 238 was not received. Additionally or alternatively, the second IED 234 may initiate the MKA protocol to establish the MKA connectivity association with the first IED 232 based on the first MKA frame 236. To this end, the second IED 234 may automatically adjust its device settings based on the first MKA frame 236 to perform the MKA protocol and obtain a CAK in accordance with the first MKA frame 236. The second IED 234 may then use the CAK to establish the MKA connectivity association.

At block 300, in response to a determination that the second MKA frame 236 has been received (e.g., within the threshold period of time), the second IED 234 may establish an MKA connectivity association based on the second MKA frame 238. As an example, the second IED 234 may transmit the second MKA frame 238 (e.g., along with data) back to the first IED 232 to indicate that the second MKA frame 238 was received. Additionally or alternatively, the second IED 234 may initiate the MKA protocol to establish the MKA connectivity association with the first IED 232 based on the second MKA frame 238. That is, the second IED 234 may automatically adjust its device settings to perform the MKA protocol to receive a CAK in accordance with the second MKA frame 238. The second IED 234 may then use the CAK to establish the MKA connectivity association.

After establishment of the MKA connectivity association, a MACsec communication link may be established between the IEDs 232, 234 based on the MKA connectivity association. For example, the second IED 234 may obtain a SAK generated based on the CAK used for establishing the MKA connectivity association. The second IED 234 may use the SAK to establish the MACsec communication link and to communicate data via the MACsec communication link.

In some embodiments, the second IED 234 may transmit an indication of the MKA frame being used to establish the MKA connectivity association. That is, the indication may specify that the second MKA frame 238 is being used to establish the MKA connectivity association based on receipt of second MKA frame 238 (e.g., performance of the procedure with respect to the block 300). The indication may specify that the first MKA frame 236 is being used to establish the MKA connectivity association based on receipt of the first MKA frame 236 and no receipt of the second MKA frame 238 (e.g., performance of the procedure with respect to the block 298).

In certain embodiments, information obtained from the performance of either of the disclosed method 260, 290 may also be used to establish secure communication links (e.g., MKA connectivity associations) between other devices communicatively coupled to the switch 170. That is, for example, based on a determination that the second IED 234 received the first MKA frame 236 and not the second MKA frame 238 (e.g., based on an indication transmitted by the first IED 232 and/or the second IED 234), other IEDs of the electric power distribution system 100 may determine the second MKA frame 238 cannot be used to establish MKA connectivity associations. Accordingly, the other IEDs may establish MKA connectivity associations with one another using the first MKA frame 236. However, based on a determination that the second IED 234 received the second MKA frame 238 (e.g., based on an indication transmitted by the first IED 232 and/or the second IED 234), the other IEDs may determine that the second MKA frame 238 can be used to establish MKA connectivity associations. Thus, other devices may establish suitable configurations of the MKA connectivity associations without having to operate in a respective auto-discovery mode.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A first intelligent electronic device (IED) of an electric power distribution system, the first IED comprising:
    processing circuitry; and
    a memory comprising instructions, wherein the instructions, when executed by the processing circuitry, are configured to cause the processing circuitry to perform operations comprising:
        transmitting, to a switch and via a communication link, a first data frame and a second data frame for subsequent transmission to a second IED;
        receiving a first indication that the second IED received the first data frame and the second data frame or receiving a second indication that the second IED received the first data frame but not the second data frame;
        based on receiving the first indication, establishing a first configuration of a media access control security (MACsec) key agreement (MKA) connectivity association for communication with the second IED; and
        based on receiving the second indication, establishing a second configuration of the MKA connectivity association for communication with the second IED.

2. The first IED of claim 1, wherein the instructions, when executed by the processing circuitry, are further configured to cause the processing circuitry to establish the MKA connectivity association via an MKA protocol.

3. The first IED of claim 1, wherein the instructions, when executed by the processing circuitry, are further configured to cause the processing circuitry to communicate data based on the first data frame in response to a determination that the switch successfully transmitted the first data frame and not the second data frame to the second IED.

4. The first IED of claim 1, wherein the instructions, when executed by the processing circuitry, are further configured to cause the processing circuitry to perform operations comprising:
    determining that the switch successfully transmitted the second data frame to the second IED based on a receipt of the second data frame at the first IED; and determining that the switch did not successfully transmit the second data frame to the second IED based on a receipt of the first data frame at the first IED.

5. The first IED of claim 1, wherein the first IED is communicatively coupled to the second IED, and the instructions, when executed by the processing circuitry, are further configured to cause the processing circuitry to determine whether the switch transmits to the second IED the second data frame based on additional data communicated by the second IED.

6. The first IED of claim 1, wherein the instructions, when executed by the processing circuitry, are further configured to cause the processing circuitry to establish a MACsec communication link based on the MKA connectivity association.

7. The first IED of claim 1, wherein the instructions, when executed by the processing circuitry, are further configured to cause the processing circuitry to use a connectivity association key (CAK) to communicate data via the MKA connectivity association.

8. The first IED of claim 1, wherein the first data frame is a first MKA frame comprising first destination media access control (DMAC) information, first EtherType information, or both; the second data frame is a second MKA frame comprising second DMAC information, second EtherType information, or both; and the first DMAC information is different from the second DMAC information, the first EtherType information is different from the second EtherType information, or both.

9. The first IED of claim 1, wherein the instructions, when executed by the processing circuitry, are further configured to cause the processing circuitry to automatically adjust device settings of the first IED based on a determination of whether the switch successfully transmitted the first data frame and not the second data frame to the second IED to establish the MKA connectivity association.

* * * * *